United States Patent [19]
Kennedy

[11] Patent Number: 5,081,827
[45] Date of Patent: Jan. 21, 1992

[54] TOBACCO SPEARING SYSTEM

[76] Inventor: Jerry L. Kennedy, Rte. 1, Box 23, Puryear, Tenn. 38251

[21] Appl. No.: 600,664

[22] Filed: Oct. 22, 1990

[51] Int. Cl.5 .......................................... A01D 45/16
[52] U.S. Cl. .................................. 56/27.5; 414/26
[58] Field of Search ...................... 56/27.5, 153, 1; 414/26

[56] References Cited

U.S. PATENT DOCUMENTS 3,798,884  3/1974  Middleton .............................. 56/27.5
3,902,607  9/1975  Middleton .............................. 414/26
4,444,001  4/1984  Thurnau et al. ........................ 56/27.5

Primary Examiner—Terry L. Melius
Attorney, Agent, or Firm—Abe Hatcher

[57] ABSTRACT

An oval track guides plates with tobacco stickholders thereon around the track so that workers at stations around the track can impale tobacco plants on the tobacco sticks in the stickholders as they pass by or as they are stopped momentarily in front of the workers. A lever-camlike object arrangement opens and closes claws on the stickholders as the lever reaches or touches the camlike object and then passes over it and drops off.

11 Claims, 2 Drawing Sheets

TOBACCO SPEARING SYSTEM

BACKGROUND OF THE INVENTION

1. Field of the Invention

This invention relates to tobacco harvesting. More particularly, it relates to a tobacco spearing operation.

2. Description of the Prior Art

Prior art manual burley tobacco plant spearing devices operated behind a tractor are primarily one or two-man operations which employ only one or two spear holders and are extremely slow-going. For example, U.S. Pat. No. 4,361,002 concerns a stick holder which mounts a stick in a stationary position suitable for spearing tobacco stalks thereon. Middleton U.S. Pat. No. 3,902,607 involves a disappearing-type spear-gripping system with jaw-sets which alternately reciprocate from a shielded retracted position to spear-gripping position and back. King U.S. Pat. No. 4,578,935 provides a stickholder positioned on a trailer behind a tractor in which a person places a stick and spears tobacco stalks thereon. Floyd et al U.S. Pat. No. 3,167,190 has to do with a rotating stick holder conveyor for securing darkfire tobacco leaves stripped from stalks on sticks.

SUMMARY OF THE INVENTION

After extended investigation I have developed a multiple-stickholder spearing system. According to my invention a plurality of tobacco stickholders are affixed to a plurality of horizontally positioned metal, aluminum, wood or alloy, preferably steel, plates so that tobacco plants may be speared on the sticks as the upright sticks are driven, for example, of a power take-off (PTO) shaft of a tractor pulling a trailer on which the plates with stickholders are placed on a track. The track may be driven from start to finish by simply using an on-off switch mechanism. According to a preferred embodiment of the invention each plate has a trigger which stops movement of the track when the trigger touches a limit switch, so that, if the speed of the track is not slow enough to permit an individual or the individuals doing the spearing to put the desired number of plants or stalks with leaves on the sticks while the sticks are passing in front of him or them after placing a spike or spear on the stick or sticks or for one at an end position to remove a stick with speared tobacco on it from a stickholder, the trigger may be used to stop movement of the track long enough for each of these workers to complete his part of the spearing process before track movement is started again by using the on-off switch mechanism. According to the invention a camlike object may be provided, for example, on the bed of the trailer, to automatically open claws of a stickholder on a moving plate when a lever associated with the stickholder touches the camlike object and to close them when it drops off the downstream edge or end of the camlike object the time between opening and closing of the claws being sufficient to permit a person at an end position around the track to remove the stick with tobacco plants speared or impaled on it from the stickholder and hand it to another worker, or place it on a conveyor, to be loaded on a wagon or the like and to put another stick in the stickholder and put a spear back on the stick.

BRIEF DESCRIPTION OF THE DRAWING

For a better understanding of my invention reference will now be made to the drawing which forms a part hereof.

In the drawing.

DETAILED DESCRIPTION OF THE INVENTION

Figure 1:
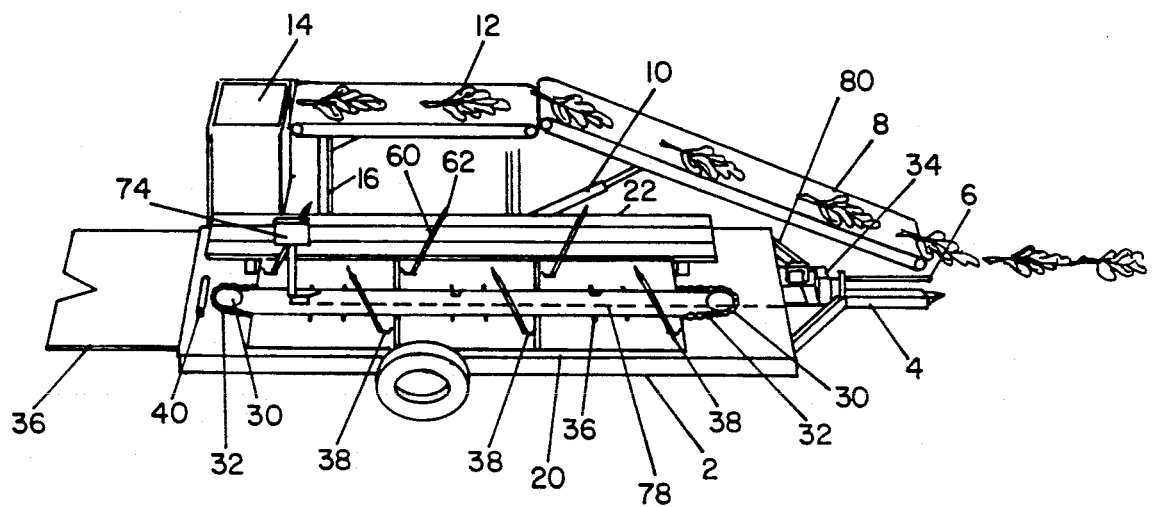
FIG. 1 is a schematic semi-perspective view of a tobacco stripping apparatus according to the invention.

In FIG. 1 are depicted the minimum representative six of the preferred at least six tobacco stickholders 38 holding tobacco sticks 60 with pointed ends or spears 62 at tobacco-impaling or spearing ends thereof, the holders 38 being affixed to work plates 20 with nut-bolt or like arrangements 36 and having swivel wheels or rollers 24 (see FIG. 2) which enable drive-chain track 32 with work plates 20 via sprockets 30 to make the sharp turns at each end of the oval path. Track 32 is operated by a stop-start switch mechanism 74 such as detailed in FIG. 3 connected via a line 78 to an electric clutch 34, a battery 80 and a power take-off (PTO) shaft 6 of a tractor (not shown). As depicted in FIG. 3, a trigger 70 on each work plate 20 connected to stop-start switch mechanism 74 stops movement of track 30 when the trigger 70 contacts arm 76 of lever switch 72.

Figure 2:
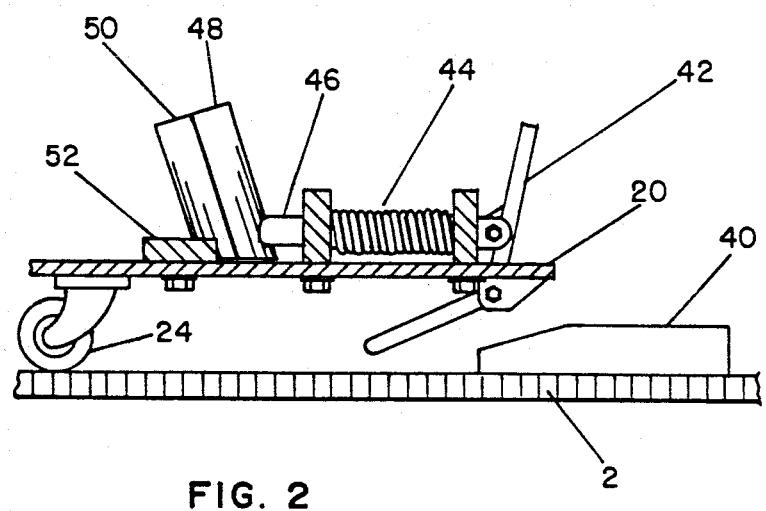
FIG. 2 is a view partly in perspective and partly in longitudinal cross-section of a representative tobacco stickholder affixed to one of the plates according to the invention and depicting how claws of the tobacco stick holder are activated to be opened when an arm of a lever touches a camlike object and be opened when the lever arm passes by and falls off of said camlike object.
Figure 3:
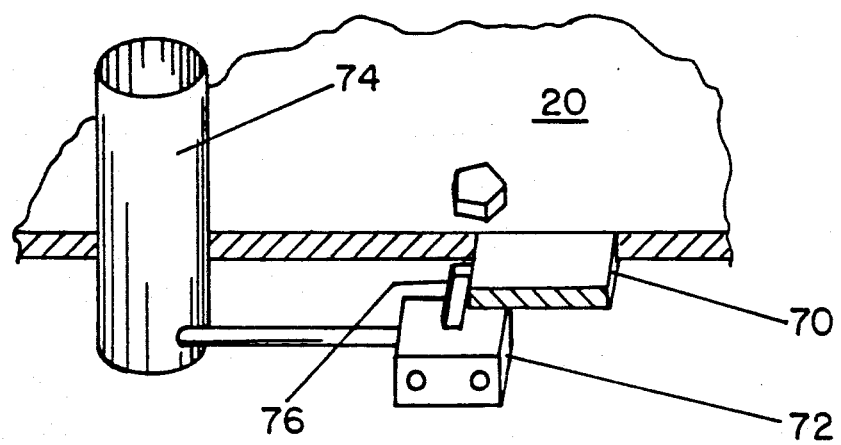
FIG. 3 is a drawing partly in perspective and partly in cross-section of a trigger-limit switch device which may be employed according to the invention to stop the driving of the track when the trigger touches the limit switch each plate having a trigger.

As detailed in FIG. 2, claws 48 and 50 (claw 50 being held in place by securing block 52) of each stickholder 38 connected to stickholder claws 48 and 50 by an activator bar surrounded by a spring 44 open mechanically when a claw-activating lever 42 on each work plate 20 touches a camlike object 40 on trailer bed 2, which has a tongue 4, a bridge plate 36, and a workers' platform 22 running a long one edge of trailer bed 2, and close when the lever 42 falls or drops off the downstream edge or end of the camlike object 40.

Tobacco plants are picked up and placed on a lift conveyor 8 which has an hydraulic lift cylinder 10 and are conducted from there onto a horizontal work conveyor 12 held up by supports 16, from which they are picked up by workers and speared on the sticks 60, with broken-off leaves and 37 trash" dropping into leaf-catcher 14.

While the invention has been described in terms of preferred embodiments, the claims appended hereto are intended to encompass all embodiments of the invention.

Having thus described by invention and certain preferred embodiments thereof, I claim:

1. Tobacco spearing apparatus comprising a substantially oval circumferentially drivable track having a plurality of substantially flat horizontally positioned plates arranged substantially equidistant apart therearound, each of said plates having a tobacco stickholder affixed thereto positioned so as to hold a tobacco stick upright at angle for spearing tobacco plants thereon, each of said tobacco stickholders having a pair of openable and closable claws each shaped similar to half of a tube so as to hold each stick securely when closed on an end of same, power means for starting, driving and stopping movement of said track and automatic mechanical means for opening and closing said claws.

2. The tobacco spearing apparatus of claim 1 wherein said track comprises a chain.

3. The tobacco spearing apparatus of claim 1 wherein said automatic mechanical means for opening and closing said claws comprise a lever in association with each stickholder and a camlike object, said lever being adapted to open said claws during driving of said track when it touches said camlike object and to close said claws when it drops off of said camlike object after a worker has removed a stick with a tobacco plant thereon from a stickholder, put another stick therein and put a spear on said stick.

4. The spearing apparatus of claim 1 wherein said power means comprise an electrical clutch.

5. The tobacco spearing apparatus of claim 1 wherein said power means comprises a mechanical power source.

6. The tobacco spearing apparatus of claim 1 wherein said power means comprises a power take-off shaft of a tractor.

7. The tobacco spearing apparatus of claim 1 wherein said apparatus is positioned on the bed of a trailer.

8. The tobacco spearing apparatus of claim 7 having a platform beside said track adapted for spearers to stand thereon and work therefrom.

9. The tobacco spearing apparatus of claim 1 wherein each plate has a trigger thereon and a limit switch in association therewith, whereby said driving of said track stops when said trigger touches said limit switch.

10. The tobacco spearing apparatus of claim 1 wherein said plates are steel plates.

11. The tobacco spearing apparatus of claim 1 wherein said plates and stickholders comprise at least 6 of each.

* * * * *